(12) United States Patent
Edouard et al.

(10) Patent No.: US 11,119,906 B1
(45) Date of Patent: Sep. 14, 2021

(54) SYSTEMS AND METHODS FOR SOFTWARE INTEGRATION VALIDATION

(71) Applicant: Stripe, Inc., San Francisco, CA (US)

(72) Inventors: Steven Edouard, San Francisco, CA (US); Andrew Qin, San Francisco, CA (US); Erin Kavanaugh, San Francisco, CA (US); Karolis Kosas, San Francisco, CA (US)

(73) Assignee: STRIPE, INC., San Francisco, CA (US)

( * ) Notice: Subject to any disclaimer, the term of this patent is extended or adjusted under 35 U.S.C. 154(b) by 0 days.

(21) Appl. No.: 16/899,037

(22) Filed: Jun. 11, 2020

(51) Int. Cl.
| | |
|---|---|
| *G06F 11/36* | (2006.01) |
| *H04L 29/06* | (2006.01) |
| *H04L 29/08* | (2006.01) |
| *G06Q 20/10* | (2012.01) |
| *G06Q 20/34* | (2012.01) |
| *G06F 9/54* | (2006.01) |
| *G06F 3/0482* | (2013.01) |
| *G06Q 30/00* | (2012.01) |

(52) U.S. Cl.
CPC ........ *G06F 11/3688* (2013.01); *G06F 3/0482* (2013.01); *G06F 9/547* (2013.01); *G06F 11/3664* (2013.01); *G06F 11/3692* (2013.01); *G06Q 20/10* (2013.01); *G06Q 20/34* (2013.01); *G06Q 30/0185* (2013.01); *H04L 63/08* (2013.01); *H04L 67/306* (2013.01)

(58) Field of Classification Search
CPC ....... H04L 63/20; H04L 63/08; H04L 67/306; G06F 11/3688; G06F 3/0482; G06F 9/547; G06F 11/3664; G06F 11/3692; G06Q 20/10; G06Q 20/34; G06Q 30/0185
See application file for complete search history.

(56) References Cited

U.S. PATENT DOCUMENTS

| | | | | |
|---|---|---|---|---|
| 2019/0149424 | A1* | 5/2019 | O'Neill | G06F 11/3428 709/224 |
| 2019/0188121 | A1* | 6/2019 | Simon | G06F 11/3688 |

OTHER PUBLICATIONS

Tobias Fertig et al.; Model-driven Testing of RESTful APIs; ACM; pp. 1497-1502; retrieved on Apr. 28, 2021. (Year: 2015).*
Sergio Segura et al.; Metamorphic Testing of RESTful Web APIs; IEEE; pp. 1083-1099; retrieved on Apr. 28, 2021 (Year: 2018).*

* cited by examiner

*Primary Examiner* — S. Sough
*Assistant Examiner* — Cuong V Luu
(74) *Attorney, Agent, or Firm* — Womble Bond Dickinson (US) LLP

(57) ABSTRACT

A method and apparatus for providing a document-integrated software integration validation by a service provider system are described. The method includes serving an interactive integration guide user interface (UI) to a user system that displays information for an application programming interface (API) integration test scenario. The method also includes tracking, based at least in part on user system identifier, a sequence of one or more API calls of the user system following the initial API call, where the sequence corresponds to one or more stages of the API integration test scenario. Then, based on a determination of correctness from the tracking, the method includes serving an updated interactive integration guide UI to the user system indicating each operation in the API integration test scenario that was performed correctly and indicating each operation in the API integration test scenario that was not performed correctly.

21 Claims, 8 Drawing Sheets

FIG. 3C

TEST SCENARIO | TEST CARD NUMBER

Succeeds and immediately processes the payment. Completed — 4242 4242 4242 4242 _342_
Last checked on pi_1231239F 1 minute ago. Awaiting new test payment.
- Created a PaymentIntent with amount and currency  View log → _344_
- Successfully collected card details with Stripe Elements
- Confirmed the PaymentIntent  View log →
- [Optional] Handled payment_intent.succeeded webhook  View Event → _346_
  * The authenticated webhook responded with a 402 error. _346-E_

Requires authentication. Stripe will trigger a modal asking for the customer to authenticate. Completed — 4000 0025 0000 3155 _348_
Last checked on pi_1231239F3 1 minute ago
- Created a PaymentIntent with amount and currency  View log →
- Successfully collected card details with Stripe Elements
- Confirmed the PaymentIntent  View log →
- Authenticated the payment
- [Optional] Handled payment_intent.succeeded webhook

Always fails with a decline code of `insufficient_funds`. — 4000 0000 0000 9995 _350_
Not checked
Waiting on test payment...

_340_

SYSTEMS AND METHODS FOR SOFTWARE INTEGRATION VALIDATION

BACKGROUND

Service provider systems, such as payment platforms, online retail systems, cloud computing systems, as well as other types of service provider systems, develop software and services to support user systems. User systems may then access the services of the service provider system over a network, such as the internet, by integrating software functionality into the development of applications run by the user systems. Thus, the applications that provide services to the users of user systems, such as customers of the user system, are developed to interact with the software and services provided by the service provider system, for example, by integrating and using one or more application programming interfaces (APIs) of the service provider system by the applications run on the user systems. Then, when the user system software applications are run, the integrated APIs may call/interact with the services of the service provider system to perform functions of the service provider system, such as processing payments, handling cloud computing requests, managing purchase and shipping requests, etc.

For example, a user system may be associated with a merchant that provides ride sharing services to its customers. However, due to the intricacies of accepting and processing payments, as well as the regulatory compliance requirements that go along with handling sensitive financial information, the user system may seek to employ the services of a payment processing service provider. Thus, when developing customer applications to, for example, offer, book, and pay for ride sharing services by customers of the ride sharing service, the applications may employ payment processing service provider APIs to interact with payment processing service provider servers to manage the financial transaction functions. That is, the user system application executed by the customer system uses payment processing service provider system API calls to handle financial aspects of the ride sharing transaction instead of the application developer (e.g. ride sharing service) managing the financial aspects of the transaction.

When integrating the service provider system services, such as by integrating sequences of one or more API based operations, a developer of the user system typically consults an integration guide that describes API calls, sequences of calls, and other aspects of integrating the user systems with a service provider system. However, consulting a static integration guide may not give a developer confidence in the integration. Furthermore, as the complexity of interactions, services offered by a service provider system, security requirements, communication protocols, remote system interactions, etc. increase, merely consulting a static guide to determine if code integrating with a service provider system may be insufficient, especially in domains involving financial transactions, handling sensitive customer information, etc. Rather, the application developers will want to know that their integrations with service provider systems are correct.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

FIG. 3C is a block diagram illustrating an embodiment of an interactive integration guide updated dynamically and in real time, and served by a document-integrated software integration validation framework of a commerce platform system.

DETAILED DESCRIPTION

Figure 1:
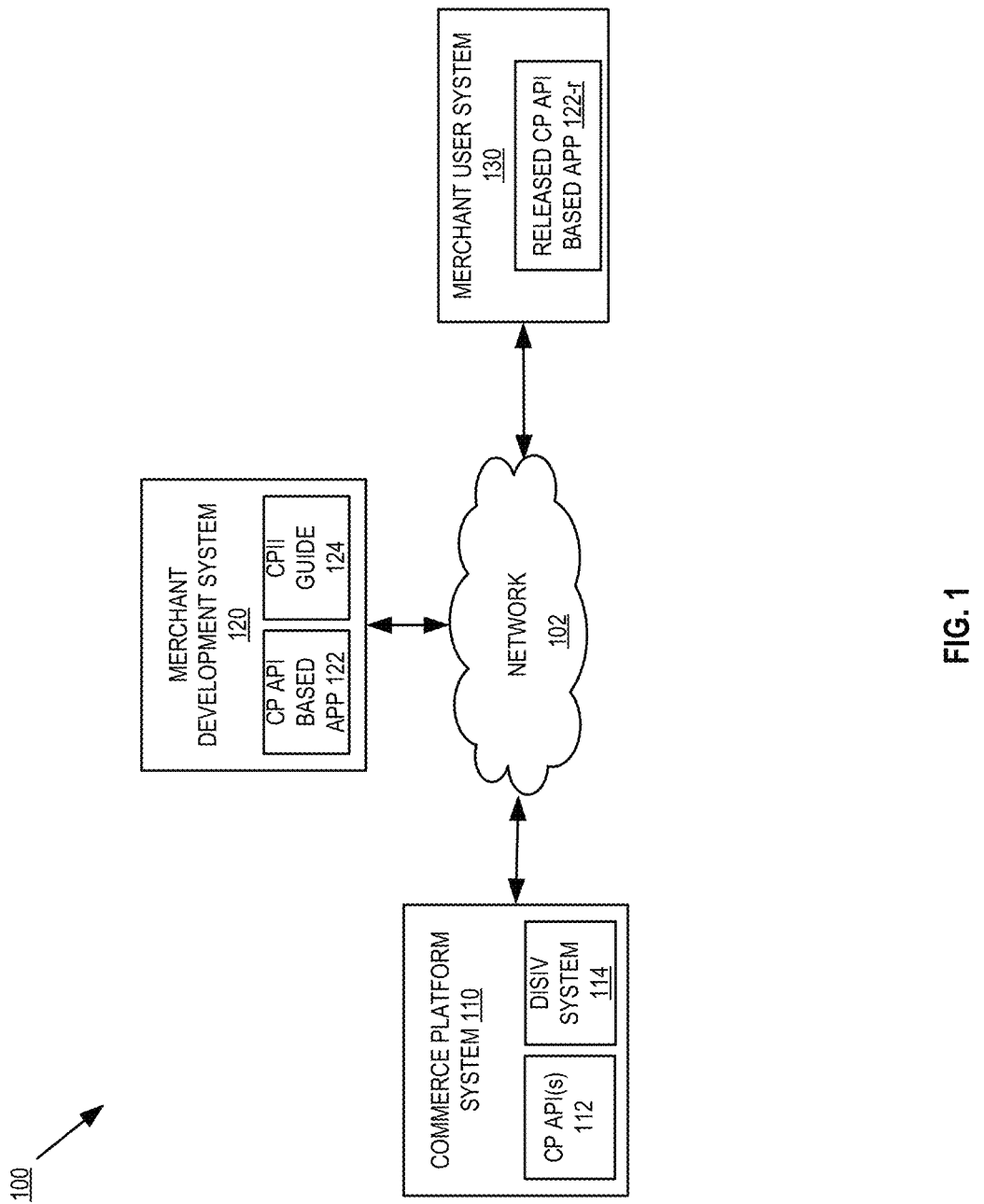
FIG. 1 is a block diagram of an exemplary system architecture for a document-integrated software integration validation framework of a commerce platform system.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "detecting", "serving", "tracking", "determining", "verifying", "generating", "updating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture 100 for a document-integrated software integration validation framework of a commerce platform system. In one embodiment, the system 100 includes a commerce platform system 110, a merchant development system 120, and a merchant user system 130. In one embodiment, one or more systems (e.g., system 120 and 130) may be mobile computing devices, such as a smartphone, tablet computer, smartwatch, etc., as well computer systems, such as a desktop computer system, laptop computer system, server computer systems, etc. The commerce platform system 110 and merchant development system 120 may also be one or more computing devices, such as one or more server computer systems, desktop computer systems, etc.

Furthermore, although not shown, the embodiments discussed herein may be utilized by a plurality of merchant development systems and merchant user systems, which may interact with the commerce platform system 110, as discussed in greater detail herein. Furthermore, although discussed from the perspective of a commerce platform system, the document-integrated software integration validation framework may be used by any service provider system that provides services, such as via one or more APIs, that are to be integrated into and run by applications developed by users, customers, subscribers, etc. of the service provider system. However, to avoid obscuring the embodiments discussed herein, only one merchant development system 120 and merchant user system 130 are shown, and such system uses the services of a commerce platform system. However, the embodiments discussed herein are not so limited.

The commerce platform system 110, merchant development system 120, and merchant user system 130 may be coupled to a network 102 and communicate with one another using any of the standard protocols for the exchange of information, including secure communication protocols. In one embodiment, one or more of the commerce platform system 110, merchant development system 120, and merchant user system 130 may run on one Local Area Network (LAN) and may be incorporated into the same physical or logical system, or different physical or logical systems. Alternatively, the commerce platform system 110, merchant development system 120, and merchant user system 130 may reside on different LANs, wide area networks, cellular telephone networks, etc. that may be coupled together via the Internet but separated by firewalls, routers, and/or other network devices. In one embodiment, commerce platform system 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, commerce platform system 110 provides financial processing services to one or more merchant systems, such as merchant user system 130 and/or merchant server based application systems (e.g., web, or app based merchant systems, which are not shown), such as managing accounts, running financial transactions, clearing transactions, performing payouts to agents, managing merchant and/or agent accounts, as well as other services typically associated with commerce platforms systems such as, for example, STRIPE™. Furthermore, the various merchant systems access such commerce platform system 110 services by integrating with one or more commerce platform (CP) API(s) 112 via CP API based app 122. The CP API based app is a software application developed by merchant development system 120 that includes one or more API calls, such as API requests and responses specifying an API endpoint at the commerce platform system 110, method functions, data, etc. For example, the CP API based application 122 can be developed to establish a connection with an API endpoint at commerce platform system 110, initiating requests (e.g., get calls), executing functions (e.g., API based functions), providing responses to API requests, executing a series of such API based functions, calls, etc., in order to, for example, accept payments, perform chargebacks, receive information via webhook(s), manage account data, or any other service provided by commerce platform system 110 via CP API(s) 112.

However, before providing access to such services, the merchant development system 120 is onboarded at the commerce platform system 110, which is a process in which a user of the merchant development system 120 (or other merchant system) interacts with the commerce platform 110 to provide and establish commerce platform account data. Such account data includes, for example, an account type, an account owner, an account name, authorized users, banking information, credit processing information, tax identification numbers preferences, corporate director information, social security numbers, etc. Furthermore, login credentials, including user name(s), passwords, and other authentication data, for authenticating authorized users to the commerce platform system 110 may also be established during the onboarding process.

Additionally, each merchant development system 120 may be provided with one or more encryption keys during the onboarding process, such as API key(s). API key(s) are unique to each merchant, where the merchant maintains a private key for encrypting message payloads, and the corresponding public key is stored by the commerce platform system 110. However, other encryption techniques, such as asymmetric and symmetric encryption techniques may be used consistent with the discussion herein. Furthermore, the API key(s) may be short lived, where commerce platform system 110 periodically replaces the encryption keys with new encryption keys. As such, commerce platform system 110 is able to securely validate messages from each merchant as belonging to specific merchants (e.g., through decryption via merchant associated key(s)), and provide a way for merchant systems, such as merchant user system 130 (executing a released CP API based app 122-4), a merchant development system 120, other merchant systems (e.g., administrative systems, backend merchant systems, etc.), to securely communicate with the commerce platform system 110.

After account establishment with commerce platform 110, merchant development system 120 may log into their account at commerce platform when accessing document-integrated software integration validation (DISIV) system 114, and access one or more libraries providing commerce platform API(s) 112 (e.g., functions, calls, methods, etc. for interaction with commerce platform system 110). DISIV system 114 is responsible for providing interactive integration guides to the merchant development system 120 when, for example, software developers using the merchant development system 120 are in the process of developing the CP API based application 122 (e.g., a mobile app, web page based app, standalone app, etc. executable by merchant user system 130 an integrating commerce platform system APIs). Furthermore, because the merchant development system 120 logs into the commerce platform system, such as by authenticating themselves via username(s), password(s), etc., commerce platform 110 is able to serve a customized guide for each merchant including real-time interactive integration testing feedback within the guide, as discussed below.

Figure 3A:
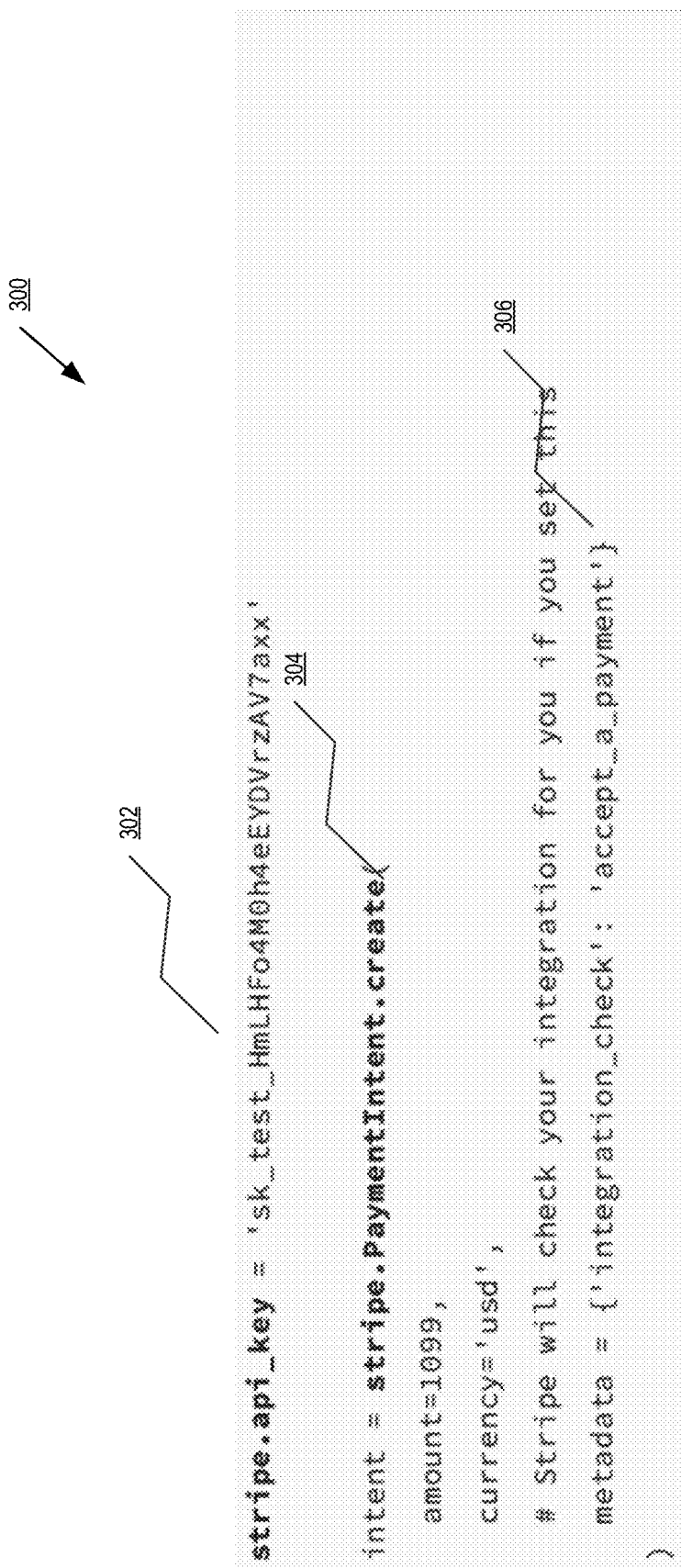
FIG. 3A is an illustration of API code for integration in a merchant developed application that is trackable by a document-integrated software integration validation framework of a commerce platform system.

In embodiments, the commerce platform interactive integration (CPII) guide 124 provided by DISIV system 114 to merchant development system is a web page based guide that provides, for example, code snippets for integrating functions and/or services provided by CP APIs 112, descriptions of integrations, troubleshooting information, frequently asked questions, and other information that is presentable in a software integration guide. For example, FIG. 3A illustrates a code snippet 300 a merchant app can use to process accepting payments from customers by commerce platform system 110. In the illustrated code snippet, there is a location 302 where a merchant system may provide their API key to the commerce platform in their code, shows an API based function 304 used in a payments flow, and further illustrates metadata field(s) 306 that serve to identify the API function to DISIV system 114 as being executed for integration testing purposes, as will be discussed in greater detail below.

Returning to FIG. 1, such snippets may be included in the integration guide 124 by DISIV system 114 for any number of commerce platform services. Furthermore, sequence of such functions may be illustrated and/or described to show the proper order in which function calls, methods, etc. are to be executed to carry out valid/correct interactions with commerce platform system 110 using CP API(s) 112. For example, if an "accept customer payment transaction" service provided by the commerce platform system 110 has four stages, the guide will show and describe those four stages with the code snippets that execute each of the stages. Thus, the CPII guide 124 provides a description of the functions, sequences, data, integration, and implementation for properly integrating the CP API based app 122 being developed with the CP API(s) 112.

Figure 3B:
FIG. 3B is a block diagram illustrating an embodiment of an interactive integration guide generated and served by a document-integrated software integration validation framework of a commerce platform system.

In an embodiment, the CPII guide 122 provides test scenarios to the merchant development system 120 for testing different aspects of integration with the commerce platform system 110. For example, as illustrated in FIG. 3B, the CPII guide user interface 320 for integrating payments with the commerce platform 110 illustrates three example scenarios for testing purposes. For example, a testing scenario 322 may be used to test an integration (e.g., a sequence of API calls, functions, etc. integrated into a merchant developed app 124). The testing scenario shows the stages 326 of the scenario, and in embodiments, includes a test scenario identifier 324. In the illustrated embodiment, where the test scenario is dealing with accepting a payment, the test scenario identifier is a test card number (e.g., a unique primary account number (PAN) or other card data identifier) that is associated by commerce platform system 110 with the specific testing scenario. That is, the test scenario identifier 324 is not a real card number, but instead a simulated number that the commerce platform system 110 is able to recognize for testing purposes. Furthermore, as illustrated in the CPII guide user interface 320, other test scenarios, their stages, and test scenario identifiers (e.g., unique card numbers each associated with respective test scenarios), are illustrated. In embodiments, merchant development system 120 is able to run the test scenarios in the CP API based app 122 being developed using the test card numbers to, for example, execute testing that the app 122 is properly performing the required operations in the required sequence in order to properly integrate with the commerce platform system 110.

When merchant development system 120 executes one or more test scenarios, such as running test transactions with the test card numbers, DISIV system 114 performs tracking of the testing in order to update the CPII guide 122 in real time based on the tracked interactions between CP API based app 122 with the CP API(s) 112 for the specific test scenarios. That is, DISIV system 114 stores data indicative of the operations, sequences, data, etc. for the various testing scenarios when executed properly and in the proper order. Thus, based on the results of the tracking, DISIV system 114 surfaces testing results by reconfiguring the display of the CPII guide 124 in real time (in response to testing) to show the success and failure of each stage for each integration that has been tested.

For example, FIG. 3C illustrates an updated CPII guide 124 that has been updated in real time based on test scenarios run using CP API based app 122 being developed by merchant development system 120. In the illustrated embodiment, two test scenarios (e.g., 342 and 348) have been updated to reflect that they have been tested (e.g. a transaction has been run using the test scenario identifier/test card number), while test scenario 350 is illustrated to show the test scenario has not been tested (e.g., no transaction has been tracked by DISIV system 114 for the test scenario identifier/test card number). Furthermore, test scenario 342 illustrates the successful operation(s) 344 performed during testing, and a failed operation 346, whereas test scenario 348 only illustrates successful operations. It should be noted that the operations may be those generated by CP API based application 122, as well as how CP API based application 122 responds to messaging initiated by the commerce platform system 110, such as how webhook handling is managed by the CP API based application 122.

In embodiments, DISIV system 114 therefore provides real-time feedback on the integrations within CP API based app 122 at a fine level detail (e.g., specific stages of specific test scenarios) to enable the developers of CP API based app 122 accurate, timely, and assuring feedback. To accomplish this, DISIV system 114 provides documentation in the form of CPII guide 124 to merchant development system 120, which describes the functions, calls, sequences, data, etc. for using CP API(s) 112, such code snippet 300 illustrated in FIG. 3A. The code snippets, descriptions, operations, sequences, etc. in the CPII guide 124 are used to describe the implementation of operation(s) to achieve valid interactions with commerce platform system 110 (e.g., process a customer payment, receive payment from CP, and other functions using the proper sequence of operations, proper data exchanges, proper formatting, etc.). As discussed above, DISIV system 114 detects login by merchant development system and thus can serve each logged-in merchant development system their own CPII guide 124. Furthermore, merchant development system 120 utilizes its own API key when interacting with commerce platform system 110, and therefore CP API(s) 112 are able to report to DISIV manager 114 when API calls are received by merchant development system 120 (e.g., when code snippet 300 is executed) by correlating the API key in the call, function, method, etc. with the API key for a specific merchant. Furthermore, as the commerce platform system 110 processes a transaction, such as when a function call of a merchant app causes commerce platform system API(s) 112 to internally process several functions, methods, invoke different systems, etc., those subsequent operations may also be tracked as belonging to the merchant via the merchant system's API key. Thus, DISIV system 114 performs comprehensive function tracking via the merchant system's API key.

In embodiments, the CP API(s) 112 further recognize the testing scenario identifiers/test card numbers. More specifically, the test card numbers are recognized as belonging to a test, and not valid/customer card numbers, and thus are not forward to external systems (e.g., authorization systems, baking systems, etc.). However, CP API(s) 112 interact with the CPI API based app 122 as if those operations were being performed to fully perform the scenario being tested (e.g., accept payment, decline payment, etc.).

In embodiments, the DISIV system 114 therefore detects specific users (e.g., based on API key), specific test scenario(s) (e.g., based on test scenario identifiers/test card numbers), a metadata tag(s) indicating that the testing should be tracked as it is interactive (e.g., tag 306 illustrated in FIG. 3A). Based on this information, DISIV system 114 tracks one or more function calls received from the CP API based application 122, as DISIV system 114 is able to determine which merchant development system a test interaction is being generated by (e.g., by the user identifier/API key), what test scenario that merchant system is testing (e.g., by the test scenario identifier/test card number), and what guide that merchant system is looking at for this testing integration (e.g., by the metadata tag generated within the guide, and the data contained in the tag). In embodiments, only a first API call includes each item of information noted above, and subsequent API calls associated with the merchant development system 120, such as those having the API key and/or test card number, subsequent internal processing (e.g., by CP API(s) 112), as well as other operations are tracked by DISIV system 114 via the API key. In other words, DISIV system 114 tracks the messaging, responses, messaging/response content, ordering of operations, etc., and compares the tracked results with expected operations, responses, data, etc. Based on the comparison, DISIV system 114 determines whether a test scenario has been integrated properly within CP API based application 122, and in the event one or more stages are not processed appropriately, what those stages were and what the failures were (e.g., incorrect sequence of operation, missing or extra data, wrong data format, lack of response to a webhook, etc.).

In embodiments, the DISIV system 114 uses the results of the test scenario tracking and analysis to update the CPII guide 124. In an embodiment, DISIV system 114 determines that the user of merchant development system 120 is still logged in, and correlates the testing results with the logged in user based on the API key for the merchant development system 120. DISIV system 114 then updates the display of the CPII 124 with an updated user interface showing the testing results. Furthermore, for failed tests and/or failed stages, DISIV system 114 may provide web links, suggestions, or other data related to the detected error (e.g., illustrated as information 346-E in FIG. 3C, as well as links to CPII guide sections for the failed stage and/or operation performed at the failed stage). Therefore, DISIV system 114 refreshes and reconfigures in real time the display provided to merchant development system 120, which instills confidence in the developers developing CP API based app 122 that the integration with the commerce platform system 110 is successful, accurate, and correct.

After integration testing is complete and/or the developer of the developer merchant system 120 is satisfied that CP API based application 122 is correct, in embodiments, the validated application is released and distributed to merchant user system as released CPI API based application 122-r. The distribution of application 122-r may be performed by directly distributing the application from merchant development system 120, through application distribution platforms, through download via cloud computing platforms, etc. In some embodiments, the released CPI API based application 122-r may be executed by the merchant development system 120. That is, for example, the released CP API based application 122-r may be a web-page based application served from system 120 to merchant user system 130 over network 102. In either embodiment or a combination of embodiments, after distribution or serving of an application, merchant user systems 130 (e.g., a user, agent, affiliate, etc. user system) may use the released application 122-r to provide services, accept payments, run transactions, access services, etc. on behalf of the merchant and using the services provided by commerce platform system 110.

Figure 2:
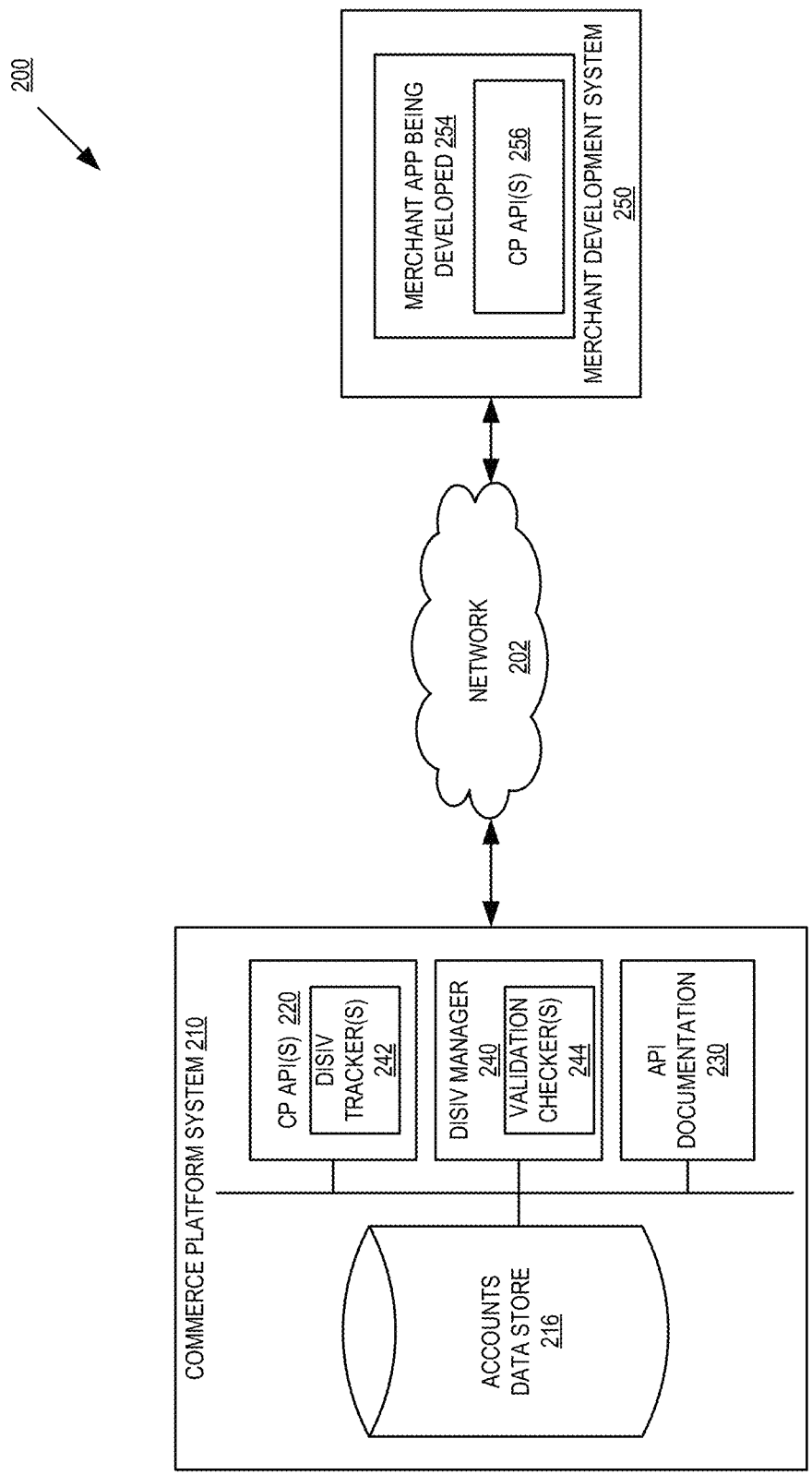
FIG. 2 is a block diagram of one embodiment of a commerce platform system providing a document-integrated software integration validation framework to a merchant development system.

FIG. 2 is a block diagram of one embodiment 200 of a commerce platform system providing a document-integrated software integration validation framework to a merchant development system. Commerce platform 210 and merchant device 250 provide additional details for the corresponding devices/systems discussed above in FIG. 1.

In one embodiment, commerce platform 210 includes an accounts data store 216, commerce platform API(s) 220, a DISIV manager 240, and API documentation 230. Although not shown, commerce platform 210 may include other systems to, for example, perform transactions and other services provided by the commerce platform 210.

Merchant development system 250 includes a merchant application being developed 254, such as a web page based application, mobile device application, desktop application, or other application. Furthermore, the application being developed 254 is integrated with one or more commerce platform API(s) 256 via CP API based function calls to, for example, establish a connection with a commerce platform system 210 endpoint, execute API calls with the endpoint, etc., by the executing application being developed 254 by merchant development system 250. In embodiments, merchant development system 250 has been previously onboarded/registered with commerce platform system 210 so that one or more merchant API key(s) have been established. Such account information and API key(s) are stored by commerce platform system 210 in an accounts data store 216, and corresponding API key(s) are stored by merchant development system 250 in a memory of that system.

In an embodiment, merchant development system 250 logs into its commerce platform system 210 account by providing login credentials and/or on or more API key(s). The account login information is verified by CP API(s) 220 with the information stored in accounts data store 216. Then, after login and validation of a merchant development system 250, merchant development system 250 may request and receive personalized integration guides (e.g., a CPII guide 124). In an embodiment, DISIV manager 240 is responsible for responding to integration guide request by generating interactive integration guides for logged-in merchant development system 250, which are served to the merchant development system 250 (e.g., within a web page or populating fields of a standalone application) for populating a graphical user interface rendered by the merchant development system 250. As discussed herein, the interactive integration guides served to a logged-in merchant system (e.g., merchant development system 250) are customized in real time for each merchant in response to integration testing.

Merchant development system 250 is responsible for developing application 254 integrating CP API(s) 256. That is, the merchant application being developed 254 includes CP API based calls, methods, function, and sequences of such operations to integrate the services provided by commerce platform system 210. Such calls, methods, functions, sequences, etc. are executed by merchant app being developed 254 an interact with CP API(s) 220. As discussed above, in order to test the interactions for a specific integration (e.g., accept a successful payment integration, handle a failed payment integration, accept a webhook message updating a payment processing result, etc.), each integration to be tested utilizes a test scenario identifier. In embodiments, the test scenario identifier is a test card number that the merchant app being developed 254 can accept for testing the application's capabilities (e.g., use a simulated card number to test a successful payment, use a different simulated card number to test a declined payment, use a different simulated card number to test a chargeback, etc.). Furthermore, each function initiating a test scenario is embedded with guide identifier metadata. In embodiments, the DISIV manager 240 embeds the guide identifier metadata in the API documentation 230 served to a merchant development system 250. As discussed above, the guide identifier metadata is a guide ID that informs the DISIV manager that merchant development system 250 is consulting an interactive guide (CPII guide 124).

In response to the merchant development system 250 executing the merchant app being developed 254 against specific test scenarios, the application 254 generates one or more API calls using CP API(s) 256 to CP API(s) 220. As discussed herein, at least the first API call includes merchant API key(s), a test scenario identifier (e.g., a test card number), and a guide identifier (e.g., metadata identifiers embedded within function calls that identify a test scenario as belonging to an interactive guide).

CPI API(s) 220 are a set of commerce platform system 210 APIs responsible for receiving and processing merchant system API calls to, for example, perform account management, process payments, perform payouts, and other functions. In embodiments, CPI API(s) 220 include one or more DISIV tracker(s) 242. The DISIV tracker(s) 242 are responsible for recognizing and tracking testing API call receipt, processing, and generation. To accomplish this, DISIV tracker(s) 242 are configured to detect the test scenario identifier accompanied with a guide identifier, which is indicative of a test and that the test relates to an interactive guide. Furthermore, DISIV tracker(s) 242 are configured to capture API key(s) received with the test scenario identifier and the guide identifier. With these pieces of information, DISIV tracker(s) 242 detect a sequence of API calls/responses for the merchant development system (e.g., by tracking API key(s) of the merchant), and correlate those calls to a specific test scenario and guide (e.g., by the test scenario identifier and guide identifier). DISIV tracker(s) 242 report each tracked event to the DISIV manager 240.

DISIV manager 240 collects the tracked API functions, calls, response, sequences of operations, etc. Then validation checker(s) 244 are responsible for validating the operations and/or sequences against expected operations and/or sequences for a corresponding testing scenario. That is, DISIV manager 240 may include a plurality of validation checker(s) 244 each corresponding to a different testing scenario. Furthermore, each validation checker 244 may store data indicative of a sequence of operations, data used in each operation, format of data, timing of operations, etc. that are expected to be processed by a proper CP API integration. Thus, validation checker(s) 244 compare the tracked operations (e.g., initial API call, subsequent API calls, content of the calls, format of data within the calls, etc.) with the expected operations for a testing scenario. In embodiments, the validation checker(s) 244 perform the comparison as tracking results are received by DISIV manager 240 from DISIV tracker(s) 242. Based on the comparison, validation checker(s) 242 cause DISIV manager 240 to update the API documentation in the interactive guide provided to and displayed by merchant development system 250 (e.g., FIG. 3C). DISIV manager 240 then serves updated guide information to configure a display of a CPII guide 124 by identifying logged-in merchant development system 250, and sending updated guide information to the logged-in merchant system 250.

Such real-time feedback on integration testing, and providing visual results indicative of the testing results, enables commerce platform system 210 to provide fine grained and real-time integration validation. Furthermore, the interactive guide (CPII guide 124) provides a visual representation of the integration success and/or failure, and an indication of what elements of an integration were successful and which need to be updated. Such real-time and detailed feedback on integration not only increase confidence in integration with CP API(s) 220, but also accelerate the development process by providing focused feedback.

Additionally, in embodiments, offline integration testing may be supported by DISIV manager 240. That is, merchant app being developed 254 may run one or more tests using one or more test scenario identifiers, guide identifiers, and CP API key(s), as discussed above, without being logged into commerce platform system 210. Then, when merchant development system 250 later logs into commerce platform system 210 and requests an interactive guide, prior tracked test results may be populated into the guide.

Figure 4:
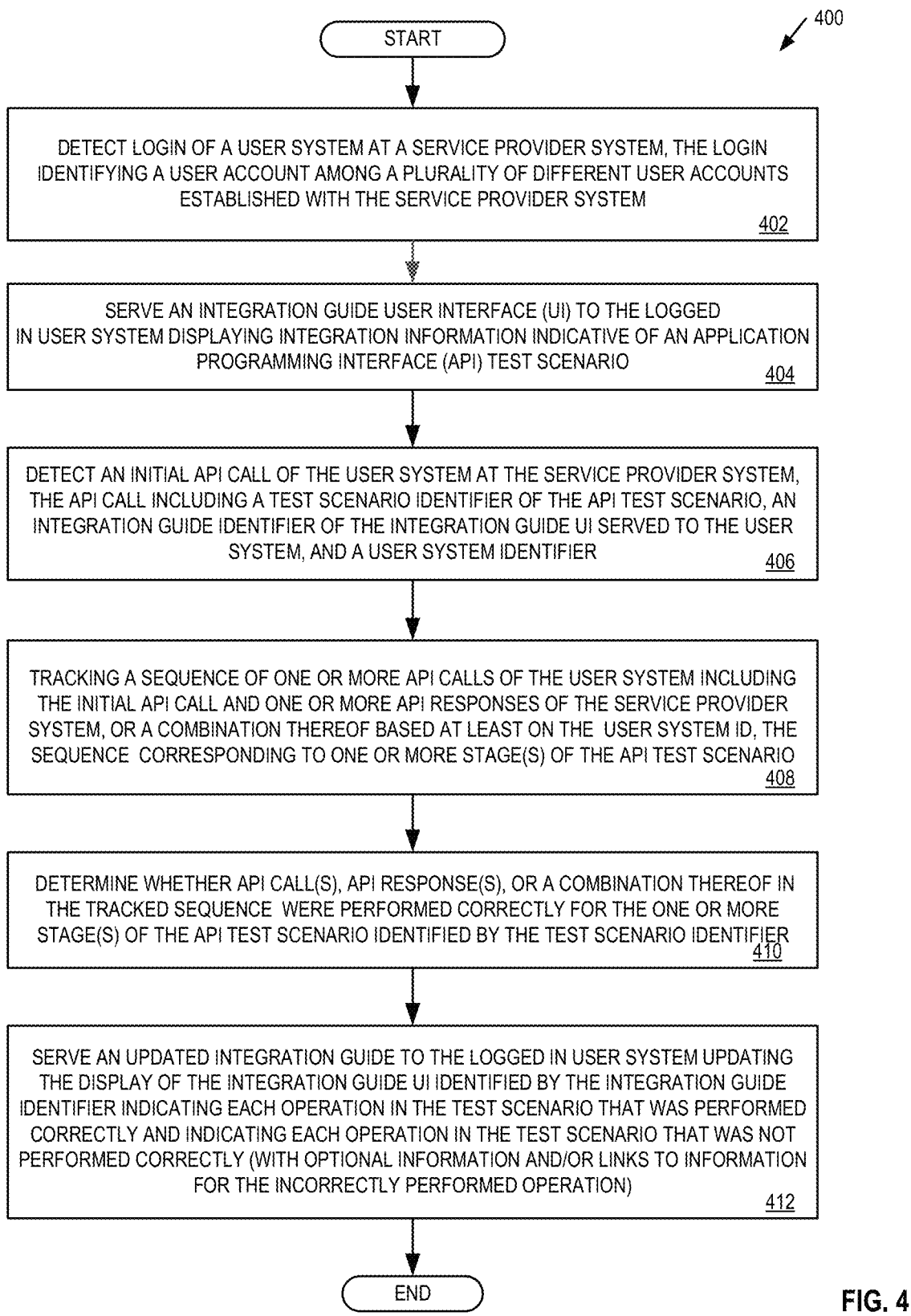
FIG. 4 is a flow diagram of one embodiment of a method for providing a document-integrated software integration validation by a service provider system.

FIG. 4 is a flow diagram of one embodiment of a method 400 for providing a document-integrated software integration validation by a service provider system. The method 400 is performed by processing logic that may comprise hardware (circuitry, dedicated logic, etc.), software (such as is run on a general purpose computer system or a dedicated machine), firmware, or a combination. In one embodiment, the method 400 is performed by a commerce platform system (e.g., commerce platform system 110 or commerce platform system 210).

Referring to FIG. 4, processing logic begins by detecting a login of a user system at a service provider system, the login identifying a user account among a plurality of different user accounts established with the service provider system (processing block 402). As discussed herein, the service provider system may be a commerce platform system providing payment processing services, a cloud storage provider system providing remote storage and application services, a retailer providing commercial services, etc. Furthermore, the service provider system may provide its services to several different user systems, such as merchant systems, and therefore authenticates such system by verifying login credentials (e.g., usernames/passwords, encryption keys such as API key(s), or a combination).

Processing logic then serves an integration guide user interface (UI) to the logged in user system displaying integration information indicative of an application programming interface (API) test scenario (processing block 404). The integration guide may display information the user system may use to integrate services of the service provider system into an application being developed, using API calls, functions, methods, and sequences of such operations. Furthermore, in embodiments, the test scenario being displayed may include a test scenario identifier (e.g. a test card number to be used when executing a test of the scenario) and guide metadata embedded within functions for the test scenario (e.g., a guide identifier indicating a user system is consulting an interactive guide when testing the associated functions).

Processing logic detects an initial API call of the user system at the service provider system, the API call including a test scenario identifier of the API test scenario, an integration guide identifier of the integration guide UI served to the user system, and a user system identifier (processing block 406). The test scenario identifier and the guide identifier discussed above, in embodiments, are accompanied by the API key in the API call. The pieces of information enable processing logic to identify the specific merchant system making the API call (and subsequent calls identified using the API key), identify the specific scenario being tested, and the interactive guide a user system is consulting when performing integration and testing. Processing logic thus tracks a sequence of one or more API calls of the user system including the initial API call and one or more API responses of the service provider system, or a combination thereof based at least in part on the user system ID, where the sequence corresponds to one or more stage(s) of the API test scenario (processing block 408).

Processing logic determines whether API call(s), API response(s), or a combination thereof in the tracked sequence were performed correctly for the one or more stage(s) of the API test scenario identified by the test scenario identifier (processing block 410). In embodiments, processing logic stores data indicative of the proper sequence, formatting, etc. of API call(s) and/or response(s) for each testing scenario. Thus, processing logic is able to determine from the tracking results and the comparison whether an integration was successful (e.g., all operations, calls, responses, data, etc. correspond with expected results), and if not successful, processing logic is able to identify the specific operation, data, timing of operations, etc. which causes the integration to fail.

Processing logic then serves an updated integration guide to the logged in user system updating the display of the integration guide UI identified by the integration guide identifier indicating each operation in the test scenario that was performed correctly and indicating each operation in the test scenario that was not performed correctly (processing block 412). That is, processing logic generates an integration testing result and reconfigures a user system UI accordingly with the testing results to provide near instantaneous integration feedback at a high level of detail. Such feedback speeds up application development and reduces application bugs. Furthermore, where an integration and/or operations within an integration are determined to be incorrect by processing logic, processing logic can further include optional information, such as a description, links to locations in an integration guide, pseudocode examples, etc. for the incorrectly performed operations. Additional relevant information may be made available to a user system testing the application, such as testing logs (e.g., showing tracking results and/or operations performed), reference numbers related to a test operation, etc.

Figure 5:
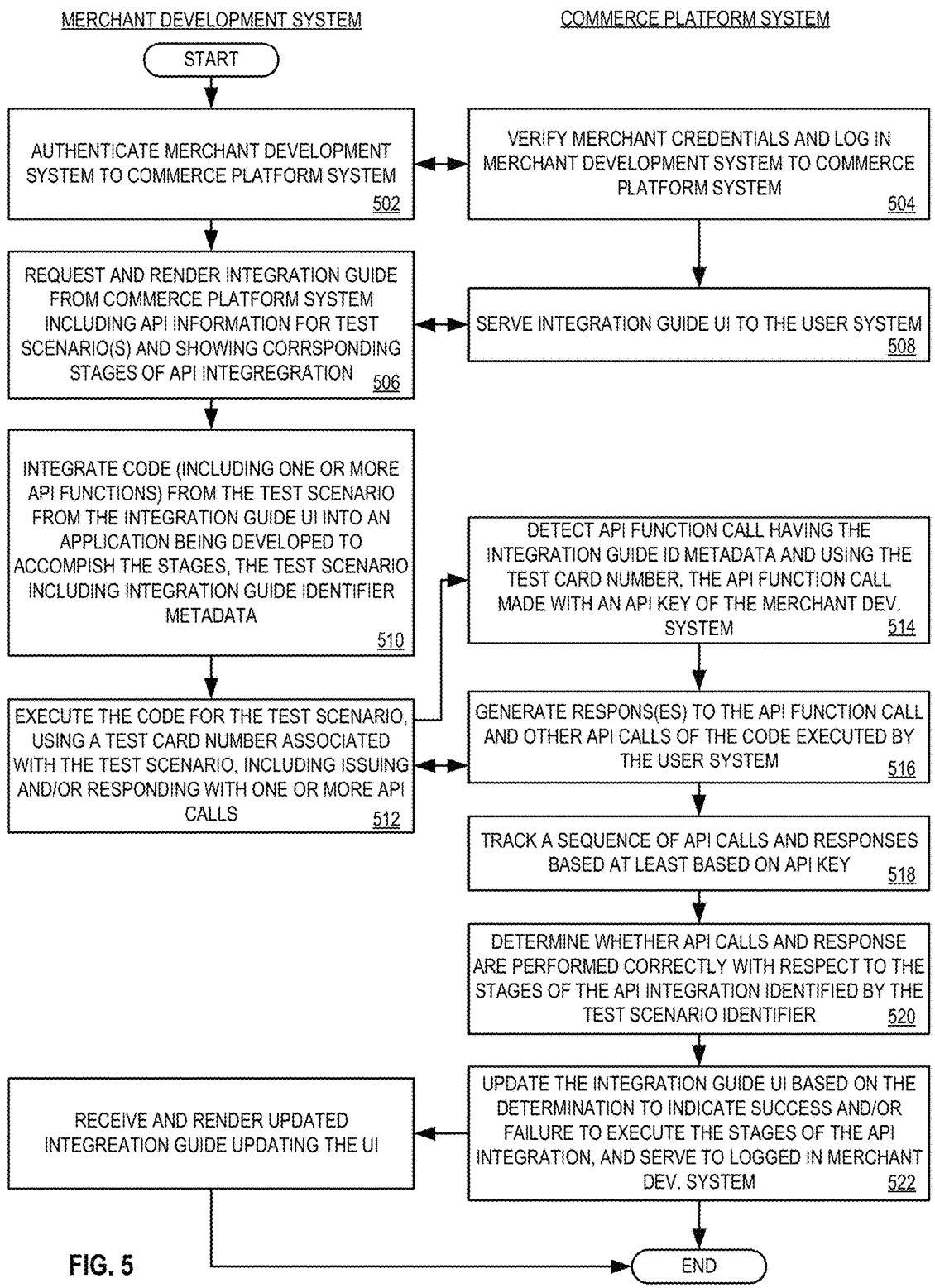
FIG. 5 is a flow diagram of another embodiment of a method for managing document-integrated software integration validation by a service provider system.

FIG. 5 is a flow diagram of another embodiment of a method 500 for managing document-integrated software integration validation by a service provider system. The method 500 is performed by processing logic that may comprise hardware (circuitry, dedicated logic, etc.), software (such as is run on a general purpose computer system or a dedicated machine), firmware, or a combination. In one embodiment, the method 500 is performed by a commerce platform system (e.g., a service provider system, such as commerce platform 110 and/or 210) and a merchant development system (e.g., a user system, such as merchant development system 120 and/or 250).

Referring to FIG. 5, processing logic of a merchant development system begins by authenticating the merchant development system to the commerce platform system (processing block 502). Processing logic of the commerce platform system verifies merchant credential(s) and logs in the merchant development system to the commerce platform system (processing block 504). In embodiments, the authentication and verification can include the exchange of credentials (e.g., user name, password, account identifier(s), API key(s), etc.), negotiating communication parameters, etc.

Processing logic of the merchant development system requests and renders an integration guide served by the commerce platform system including API information for test scenario(s) and showing corresponding stages of API integration (processing block 506). Processing logic of the commerce platform system serves the integration guide UI to the merchant development system that is logged in, and in response to the merchant system request (processing block 508). As discussed herein, the integration guide is a software development guide that describes the APIs provides by the commerce platform, and the functions, calls, methods, etc. that can be employed within applications developed to interact with the commerce platform system via that API(s). To this end, the development guide served to merchant development system is an interactive guide, which displays test scenarios to a user of the merchant development system. The test scenarios correspond to functions provided by the commerce platform system (e.g., processing a successful transaction, processing a transaction that fails, processing a chargeback, etc.), the stages that make up the scenario (e.g., sequential operations that are performed by the merchant development system's application being developed), data for use during the testing of such scenarios (e.g., test scenario identifiers and metadata identifiers, such as the test card numbers and guide identifiers discussed above), and snippets of code that, in embodiments, may include the guide identifiers (e.g., to enable cut and paste functionality for the interactive guide).

Processing logic of the merchant development system integrates code (including one or more API functions) form the test scenario from the integration guide UI into an application being developed to accomplish the stages, the test scenario including the integration guide identifier metadata (processing block 510). Processing logic then executes the code for the test scenario, using a test card number associated with the test scenario, including issuing and/or responding with one or more API calls (processing block 512).

Processing logic of the commerce platform system detects an API function call having the integration guide ID metadata and using the test card number, wherein the API function call is made with an API key of the merchant development system (processing block 514). As discussed herein, based on the detection of an API key, a test scenario identifier, and a guide identifier, processing logic determines what merchant system is performing testing (e.g., by the API key), what scenario is being tested (e.g., by the test scenario ID, such as running a test transaction for a test card number), and that the testing is being performed in view of an interactive guide (e.g. by detecting the guide ID within the API call). Processing logic generates response(s) to the API function call and other API calls of the code executed by the merchant development system (processing block 516). In embodiments, the merchant development system and the commerce platform interact via the API based messaging to perform the operation being tested. In embodiments, the initial API function call may include the three identifiers to inform commerce platform system of the testing being performed and the specific scenario, and subsequent API function calls need no include such information. Processing logic of the commerce platform system tracks a sequence of API calls and responses based at least in part on the API key included in the calls and responses (processing block 518).

Processing logic of the commerce platform uses the tracked API calls and response to determine whether the API calls and response are performed correctly with respect to the stages of the API integration identified by the test scenario identifier (processing block 520). In embodiments, processing logic compares the tracked calls and responses with expected calls and responses through stages of a test scenario. For example, a test scenario for accepting a payment may include three stages (e.g., FIG. 3B, scenario 322), as well as an optional webhook stage (not shown in FIG. 3B). Thus, processing logic could track and compare, for the test scenario 322 associated with test card number 4242 4242 4242 4242 illustrated in FIG. 3B, operations for creating a payment intent object (e.g., an API call to generate a new payment) with the appropriate data (e.g., an amount of the payment and a currency associated with the payment, successfully collecting and transferring payment card details, and then submitting a finalized payment to the commerce platform system.

Processing logic updates the integration guide UI based on the determination to indicate success and/or failure to execute the stages of the API integration, and serves the update to the logged in merchant development system (processing block 522). Processing logic of the merchant development system receives the updated integration guide that updates the interactive integration guide (processing block 524). For example, as illustrated in FIG. 3C for test scenario 342 corresponding to test card number 4242 4242 4242 4242, successful stages are indicated 344 and a failed stage is indicated 346 (with information describing the point of failure 346-E). In embodiments, the updated UI is served and rendered by processing logic in real time as testing is performed to provide feedback and/or confirmation as to successful integration.

Although discussed in the context of commerce platform systems providing services to merchant systems, the processes of FIGS. 4 and 5 are extensible to other systems in which services are provided to remote systems via APIs, and for which testing of software systems using the API integrated application is performed. Such testing enables, regardless of type of service provider system, real time feedback captured through the configuration and tracking of interactions between the remote systems.

Figure 6:
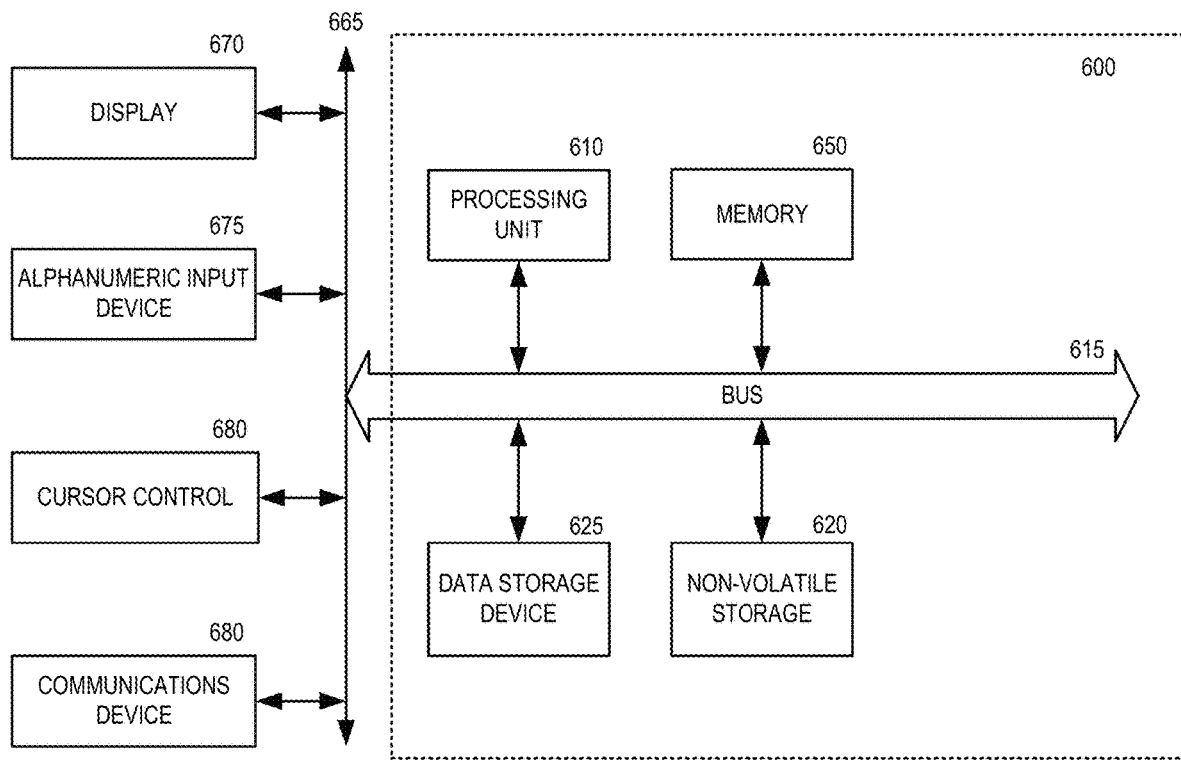
FIG. 6 is one embodiment of a computer system that may be used to support the systems and operations discussed herein.

FIG. 6 is one embodiment of a computer system that may be used to support the systems and operations discussed herein. For example, the computer system illustrated in FIG. 6 may be used by a commerce platform system, a merchant development system, merchant user system, etc. It will be apparent to those of ordinary skill in the art, however that other alternative systems of various system architectures may also be used.

The data processing system illustrated in FIG. 6 includes a bus or other internal communication means 615 for communicating information, and a processor 610 coupled to the bus 615 for processing information. The system further comprises a random access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor 610. The system also comprises a read only memory (ROM) and/or static storage device 620 coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display device 670, such as a light emitting diode (LED) display or a liquid crystal display (LCD) coupled to bus 615 through bus 665 for displaying information to a computer user. An alphanumeric input device 675, including alphanumeric and other keys, may also be coupled to bus 615 through bus 665 for communicating information and command selections to processor 610. An additional user input device is cursor control device 680, such as a touchpad, mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 650, mass storage device 625, or other storage medium locally or remotely accessible to processor 610.

It will be apparent to those of ordinary skill in the art that the system, method, and process described herein can be implemented as software stored in main memory 650 or read only memory 620 and executed by processor 610. This control logic or software may also be resident on an article of manufacture comprising a computer readable medium having computer readable program code embodied therein and being readable by the mass storage device 625 and for causing the processor 610 to operate in accordance with the methods and teachings herein.

The embodiments discussed herein may also be embodied in a handheld or portable device containing a subset of the computer hardware components described above. For example, the handheld device may be configured to contain only the bus 615, the processor 610, and memory 650 and/or 625. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need be present for the device to function.

Figure 7:
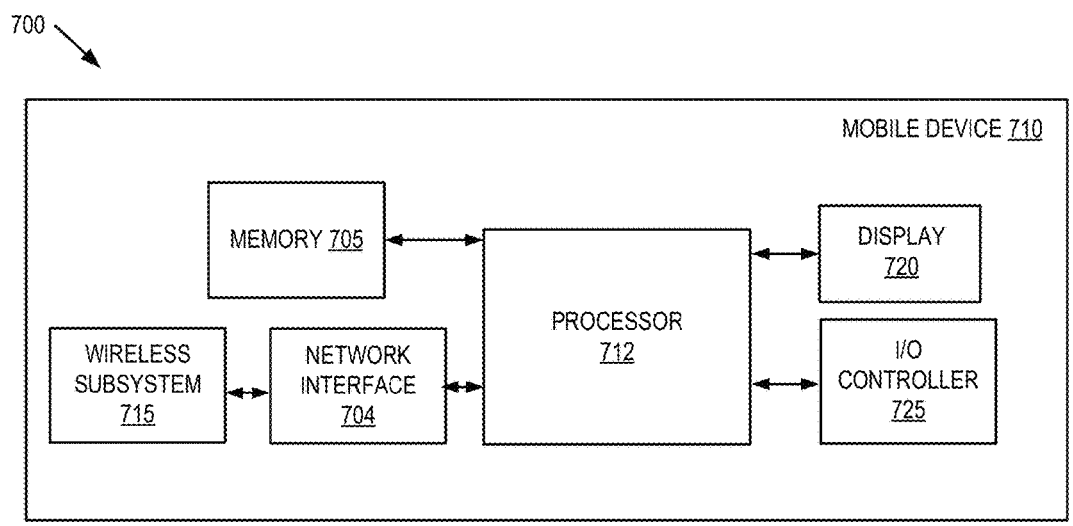
FIG. 7 is one embodiment of a mobile device that may be used to support the systems and operations discussed herein.

FIG. 7 is block diagram of one embodiment 700 of a mobile device. Mobile device 710 may be used, for example, as a merchant user device when interacting with the commerce platform system when executing a released commerce platform API integrated application and/or when testing a commerce platform API based application.

In one embodiment, mobile device 710 is a system, which may include one or more processors 712, a memory 705, I/O controller 725, network interface 704, and display 720. Mobile device 710 may also include a number of processing modules, which may be implemented as hardware, software, firmware, or a combination. It should be appreciated that mobile device 710 may also include, although not illustrated, a user interface (e.g., keyboard, touch-screen, or similar devices), a power device (e.g., a battery), as well as other components typically associated with electronic devices. Network interface 704 may also be coupled to a number of wireless subsystems 715 (e.g., Bluetooth, Wi-Fi, Cellular, or other networks) to transmit and receive data streams through a wireless link to/from a network, or may be a wired interface for direct connection to networks (e.g., the Internet, Ethernet, or other wireless systems). In one embodiment, both network interface 704 and wireless subsystem 715 couple mobile device 710 to a network.

Memory 705 may be coupled to processor 712 to store instructions for execution by processor 712. In some embodiments, memory 705 is non-transitory. It should be appreciated that embodiments as described herein may be implemented through the execution of instructions, for example as stored in the memory 705 or other element, by processor 712 of mobile device 710 and/or other circuitry of mobile device 710 and/or other devices. Particularly, circuitry of mobile device 710, including but not limited to processor 712, may operate under the control of a program, routine, or the execution of instructions to execute methods or processes in accordance with the embodiments described herein. For example, such a program may be implemented in firmware or software (e.g. stored in memory 705 and/or other locations) and may be implemented by processors, such as processor 712, and/or other circuitry of mobile device 710. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines or modules described herein may be performed by mobile device 710 itself and/or some or all of the functions, engines or modules described herein may be performed by another system connected through I/O controller 725 or network interface 704 (wirelessly or wired) to mobile device 710. Thus, some and/or all of the functions may be performed by another system and the results or intermediate calculations may be transferred back to mobile device 710. In some embodiments, such other device may comprise a server, such as commerce platform 110 or 210.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

We claim:

1. A method for providing a document-integrated software integration validation by a service provider system comprising:

serving, by a service provider system, an interactive integration guide user interface (UI) to a user system, the interactive integration guide UI displaying information for an application programming interface (API) integration test scenario;

detecting, by the service provider system, an initial API call generated by the user system, the initial API call including a test scenario identifier of the API integration test scenario, an integration guide identifier of the interactive integration guide UI served to the user system, and a user system identifier (ID);

tracking, by the service provider system based at least in part on the user system ID, a sequence of one or more API calls of the user system including the initial API call, one or more subsequent API calls of the user system, one or more API responses of the service provider system, or a combination thereof following the initial API call, where the tracked sequence corresponds to one or more stages of the API integration test scenario, wherein the initial API call and the one or more subsequent API calls of the user system are generated by a software application, which integrates services of the service provider system using one or more APIs of the service provider system, being developed by the user system;

determining whether the initial API call, the sequence of one or more API calls, the one or more subsequence API calls, the one or more API responses, or the combination thereof in the tracked sequence were performed correctly for the one or more stages of the API integration test scenario identified by the test scenario identifier; and serving, by the service provider system, an updated interactive integration guide UI to the user system indicating each operation in the API integration test scenario that was performed correctly and indicating each operation in the API integration test scenario that was not performed correctly.

2. The method of claim 1 further comprising:

receiving, by the service provider system, login credentials from a user system purported to be associated with a user system account maintained by the service provider system;

in response to verifying the received login credentials with previously established login credentials associated with the user system account, logging in the user system associated with the user system account to the service provider system; and the serving, by the service provider system, the updated interactive integration guide UI to the user system further comprises serving the updated interactive integration guide UI to the logged in user system associated with the user account.

3. The method of claim 1, wherein the service provider system comprises a commerce platform system that provides payment processing services to the user system via API based messaging provided by one or more commerce platform APIs.

4. The method of claim 3, wherein:

the test scenario identifier comprises a unique test payment card number associated with the API integration test scenario, the integration guide identifier comprises a unique metadata identifier rendered within an API call displayed in the interactive integration guide user interface served to the user system, and the user system identifier comprises an API key generated by the commerce platform system for a user system account maintained by the commerce platform system.

5. The method of claim 1, wherein the one or more API calls generated by the user system and the one or more API responses of the service provider system are tracked in real time by the service provider system, and the serving of the updated interactive integration guide UI to the user system is performed in response to a determination of a correctness of a final stage that concludes the one or more stages of the API integration test scenario based on the one or more API calls and/or the one or more API responses tracked for the final stage.

6. The method of claim 1, wherein the one or more API calls generated by the user system and the one or more API responses of the service provider system are tracked in real time by the service provider system, and the serving of the updated interactive integration guide UI to the user system is performed periodically in response to a determination of a correctness of each stage of the one or more stages of the API integration test scenario based on the one or more API calls and/or the one or more API responses tracked for said each stage.

7. The method of claim 1, wherein the service provider system stores an expected sequence of one or more API calls and/or one or more expected API responses associated with each stage of the one or more stages, and determining whether the API integration test scenario is performed correctly by the user system comprises:

comparing the expected sequence of one or more API calls and/or the one or more expected API responses with the initial API call, the one or more subsequent API calls, the one or more API responses, or the combination thereof in the tracked sequence.

8. A non-transitory computer readable storage medium including instructions that, when executed by a processor, cause the processor to perform a method for providing a document-integrated software integration validation by a service provider system, the method comprising:

serving, by the service provider system, an interactive integration guide user interface (UI) to a user system, the interactive integration guide UI displaying information for an application programming interface (API) integration test scenario;

detecting, by the service provider system, an initial API call generated by the user system, the initial API call including a test scenario identifier of the API integration test scenario, an integration guide identifier of the interactive integration guide UI served to the user system, and a user system identifier (ID);

tracking, by the service provider system based at least in part on the user system ID, a sequence of one or more API calls of the user system including the initial API call, one or more subsequent API calls of the user system, one or more API responses of the service provider system, or a combination thereof following the initial API call, where the tracked sequence corresponds to one or more stages of the API integration test scenario, wherein the initial API call and the one or more subsequent API calls of the user system are generated by a software application, which integrates services of the service provider system using one or more APIs of the service provider system, being developed by the user system;

determining whether the initial API call, the sequence of one or more API calls, the one or more subsequence API calls, the one or more API responses, or the combination thereof in the tracked sequence were performed correctly for the one or more stages of the API integration test scenario identified by the test scenario identifier; and serving, by the service provider system, an updated interactive integration guide UI to the user system indicating each operation in the API integration test scenario that was performed correctly and indicating each operation in the API integration test scenario that was not performed correctly.

9. The non-transitory computer readable storage medium of claim 8, wherein the method further comprising:

receiving, by the service provider system, login credentials from a user system purported to be associated with a user system account maintained by the service provider system;

in response to verifying the received login credentials with previously established login credentials associated with the user system account, logging in the user system associated with the user system account to the service provider system; and the serving, by the service provider system, the updated interactive integration guide UI to the user system further comprises serving the updated interactive integration guide UI to the logged in user system associated with the user account.

10. The non-transitory computer readable storage medium of claim 8, wherein the service provider system comprises a commerce platform system that provides payment processing services to the user system via API based messaging provided by one or more commerce platform APIs.

11. The non-transitory computer readable storage medium of claim 10, wherein:

the test scenario identifier comprises a unique test payment card number associated with the API integration test scenario, the integration guide identifier comprises a unique metadata identifier rendered within an API call displayed in the interactive integration guide user interface served to the user system, and the user system identifier comprises an API key generated by the commerce platform system for a user system account maintained by the commerce platform system.

12. The non-transitory computer readable storage medium of claim 8, wherein the one or more API calls generated by the user system and the one or more API responses of the service provider system are tracked in real time by the service provider system, and the serving of the updated interactive integration guide UI to the user system is performed in response to a determination of a correctness of a final stage that concludes the one or more stages of the API integration test scenario based on the one or more API calls and/or the one or more API responses tracked for the final stage.

13. The non-transitory computer readable storage medium of claim 8, wherein the one or more API calls generated by the user system and the one or more API responses of the service provider system are tracked in real time by the service provider system, and the serving of the updated interactive integration guide UI to the user system is performed periodically in response to a determination of a correctness of each stage of the one or more stages of the API integration test scenario based on the one or more API calls and/or the one or more API responses tracked for said each stage.

14. The non-transitory computer readable storage medium of claim 8, wherein the service provider system stores an expected sequence of one or more API calls and/or one or more expected API responses associated with each stage of the one or more stages, and determining whether the API integration test scenario is performed correctly by the user system comprises:

comparing the expected sequence of one or more API calls and/or the one or more expected API responses with the initial API call, the one or more subsequent API calls, the one or more API responses, or the combination thereof in the tracked sequence.

15. A service provider system providing a document-integrated software integration validation, comprising:

a memory; and a processor coupled with the memory configured to:

serve an interactive integration guide user interface (UI) to a user system, the interactive integration guide UI displaying information for an application programming interface (API) integration test scenario, detect an initial API call generated by the user system, the initial API call including a test scenario identifier of the API integration test scenario, an integration guide identifier of the interactive integration guide UI served to the user system, and a user system identifier (ID), track, based at least in part on the user system ID, a sequence of one or more API calls of the user system including the initial API call, one or more subsequent API calls of the user system, one or more API responses of the service provider system, or a combination thereof following the initial API call, where the tracked sequence corresponds to one or more stages of the API integration test scenario, wherein the initial API call and the one or more subsequent API calls of the user system are generated by a software application, which integrates services of the service provider system using one or more APIs of the service provider system, being developed by the user system;

determine whether the initial API call, the sequence of one or more API calls, the one or more subsequence API calls, the one or more API responses, or the combination thereof in the tracked sequence were performed correctly for the one or more stages of the API integration test scenario identified by the test scenario identifier, and serve an updated interactive integration guide UI to the user system indicating each operation in the API integration test scenario that was performed correctly and indicating each operation in the API integration test scenario that was not performed correctly.

16. The system of claim 15 wherein the processor is further configured to:

receive login credentials from a user system purported to be associated with a user system account maintained by the service provider system;

in response to verifying the received login credentials with previously established login credentials associated with the user system account, log in the user system associated with the user system account to the service provider system; and the processor configured to serve the updated interactive integration guide UI to the user system associated with the user system account further comprises serving the updated interactive integration guide UI to the logged in user system associated with the user account.

17. The system of claim 15, wherein the service provider system comprises a commerce platform system that provides payment processing services to the user system via API based messaging provided by one or more commerce platform APIs.

18. The system of claim 17, wherein:

the test scenario identifier comprises a unique test payment card number associated with the API integration test scenario, the integration guide identifier comprises a unique metadata identifier rendered within an API call displayed in the interactive integration guide user interface served to the user system, and the user system identifier comprises an API key generated by the commerce platform system for a user system account maintained by the commerce platform system.

19. The system of claim 15, wherein the one or more API calls generated by the user system and the one or more API responses of the service provider system are tracked in real time by the service provider system, and the serving of the updated interactive integration guide UI to the user system is performed in response to a determination of a correctness of a final stage that concludes the one or more stages of the API integration test scenario based on the one or more API calls and/or the one or more API responses tracked for the final stage.

20. The system of claim 15, wherein the one or more API calls generated by the user system and the one or more API responses of the service provider system are tracked in real time by the service provider system, and the serving of the updated interactive integration guide UI to the user system is performed periodically in response to a determination of a correctness of each stage of the one or more stages of the API integration test scenario based on the one or more API calls and/or the one or more API responses tracked for said each stage.

21. The system of claim 15, wherein the service provider system stores an expected sequence of one or more API calls and/or one or more expected API responses associated with each stage of the one or more stages, and the processor configured to determine whether the API integration test scenario is performed correctly by the user system comprises the processor configured to:
    compare the expected sequence of one or more API calls and/or the one or more expected API responses with the initial API call, the one or more subsequent API calls, the one or more API responses, or the combination thereof in the tracked sequence.

\* \* \* \* \*